Dec. 19, 1967

C. J. GOODHOUSE ET AL

3,358,924

SYSTEM FOR CONTROLLING HEATING MEANS
AND PARTS THEREFOR OR THE LIKE

Filed March 21, 1966

INVENTORS
CARL J. GOODHOUSE
FRANCIS J. FORTE

BY

*Candor & Candor*

THEIR ATTORNEYS

Dec. 19, 1967 C. J. GOODHOUSE ETAL 3,358,924
SYSTEM FOR CONTROLLING HEATING MEANS
AND PARTS THEREFOR OR THE LIKE
Filed March 21, 1966

INVENTORS
CARL J. GOODHOUSE
FRANCIS J. FORTE
BY
Candor & Candor
THEIR ATTORNEYS

INVENTORS
CARL J. GOODHOUSE
FRANCIS J. FORTE
BY

*Cauda & Cauda*

THEIR ATTORNEYS

Dec. 19, 1967  C. J. GOODHOUSE ETAL  3,358,924
SYSTEM FOR CONTROLLING HEATING MEANS
AND PARTS THEREFOR OR THE LIKE
Filed March 21, 1966  5 Sheets-Sheet 5

INVENTORS
CARL J. GOODHOUSE
FRANCIS J. FORTE
BY

*Candn & Candn*

THEIR ATTORNEYS

United States Patent Office 3,358,924
Patented Dec. 19, 1967

3,358,924
SYSTEM FOR CONTROLLING HEATING MEANS AND PARTS THEREFOR OR THE LIKE
Carl J. Goodhouse, Litchfield, and Francis J. Forte, Waterbury, Conn., assignors to Robertshaw Controls Company, Richmond, Va., a corporation of Delaware
Filed Mar. 21, 1966, Ser. No. 535,853
32 Claims. (Cl. 236—46)

ABSTRACT OF THE DISCLOSURE

This disclosure relates to a control means for a heating means for an oven or the like wherein the housewife or the like can place food in the oven and set a first selector means so that the heating means of the oven will not be turned on to cook the food until after the lapse of a selected time period, at which time the heating means will be turned on and cook the food through a predetermined time period previously selected by the housewife or the like by a second selector means so that when the second time period has lapsed, the control means will reduce the heating effect of the heating means of the oven to a warmth-retaining and non-cooking temperature until the housewife or the like completely turns off the control system whereby the food will be automatically cooked and be maintained at a warmth-retaining and non-cooking temperature by the control means of this invention.

---

This invention relates to an improved control system for a heating means, such as a heating means for a domestic cooking appliance or the like, as well as to improved timer parts and the like for such a control system or the like.

It is well known that various cooking apparatus have been provided with timer means to permit the housewife or the like to place food in an oven to be immediately cooked at the desired cooking temperature for a preselected length of time whereby after the lapse of the preselected length of cooking time, the control system automatically reduces the temperature in the oven to a warmth-retaining and non-cooking temperature for an indefinite length of time. In this manner, the housewife or the like can remove the cooked food from the oven at any desired time during the warmth-retaining and non-cooking operation thereof, to serve the food without requiring serving of the food exactly at the time the cooking operation is completed.

However, according to the teachings of this invention, improved control means are provided wherein the housewife or the like can place food in the oven and not have the cooking operation start until after the lapse of a first preselected time interval whereby the control system will thereafter cook the food at the selected cooking temperature for a second selected time interval and, subsequently, reduce the temperature of the oven to the warmth-retaining and non-cooking temperature after the lapse of the second selected time interval.

In this manner, a relatively long period of warmth-retaining and non-cooking temperature for the oven is not required should the housewife or the like desire to place the food to be cooked in the oven in the morning or the like for the subsequent serving in the evening even though the actual serving time in the evening is indefinite. Thus, the housewife or the like can place the food to be cooked in the oven in the morning and return in the evening and serve the cooked food at the warmth-retaining and non-cooking temperature without requiring the heating means of the oven to be continuously on throughout the entire day as in the prior known cooking apparatus whereby the cost of the cooking operation is substantially reduced over the prior known "cook and hold" operations.

Accordingly, it is an object of this invention to provide an improved control system for the heating means of a cooking apparatus or the like, the control system of this invention having one or more of the novel features set forth above or hereinafter shown or described.

Another object of this invention is to provide improved parts for such a control system or the like.

Other objects, uses and advantages of this invention are apparent from a reading of this description which proceeds with reference to the accompanying drawings forming a part thereof and wherein:

While the various features of this invention are hereinafter described and illustrated as being particularly adaptable for controlling the heating operation of a domestic cooking oven or the like, it is to be understood that the various features of this invention can be utilized singly or in any combination thereof to provide control means for other devices as desired.

Therefore, this invention is not to be limited to only the embodiments illustrated in the drawings, because the drawings are merely utilized to illustrate one of the wide variety of uses of this invention.

Figure 1:
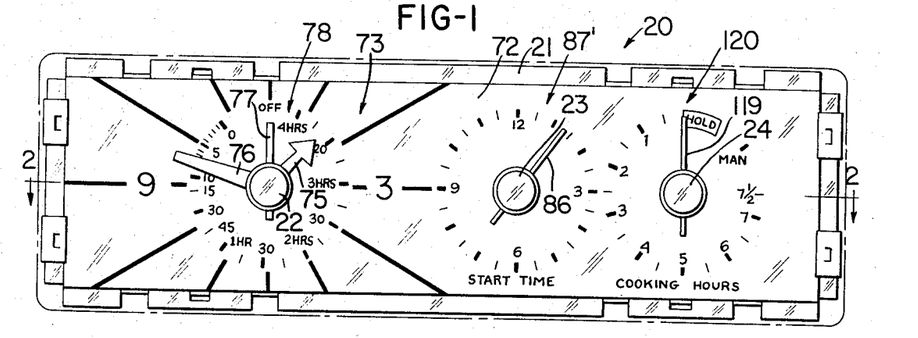
FIGURE 1 is a front view of the improved compact timer control means of this invention.

Referring now to FIGURE 1, the improved timer control means of this invention is generally indicated by the reference numeral 20 and comprises a compact frame means 21 containing a conventional clock handle and timer means 22, a manually operated cooking start time handle 23 and a manually operated cooking time handle means 24.

The compact timer means of FIGURE 1 is utilized in the system 25 of this invention schematically illustrated in FIGURE 6, the system 25 including a cooking oven 26 having a heating means 27, such as electrical heater means having one side 28 interconnected to a power source lead $L_2$ and the other side 29 interconnected to the other power source lead $L_1$ by the timer means 20 of this invention in a manner hereinafter described.

While the heating means 27 of this invention is hereinafter described as being an electrical heating means, it is to be understood that the various features of this invention can be utilized to control fuel burning heating means if desired.

Figure 3:
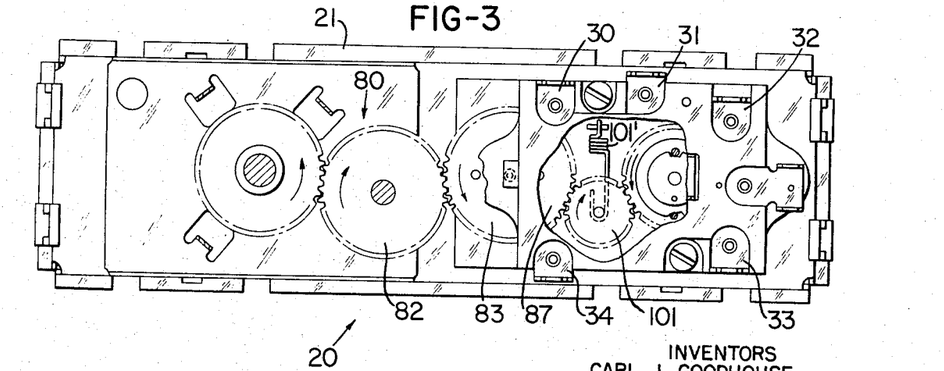
FIGURE 3 is a rear view of the structure illustrated in FIGURE 1 with various parts thereof broken away.
Figure 6:
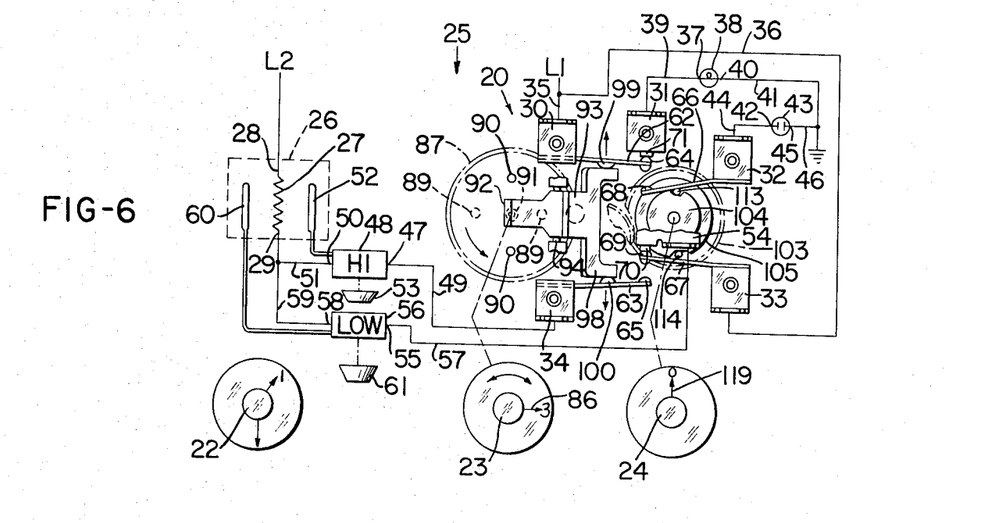
FIGURE 6 is a schematic view illustrating the improved control system of this invention utilizing the structure of FIGURE 1, the system in FIGURE 6 being set for its first lapse of time.

As illustrated in FIGURES 3 and 6, the frame means 21 of the timer means 20, has five terminals 30, 31, 32, 33 and 34 adapted to be electrically connected in the manner illustrated in FIGURE 6.

In particular, it can be seen in FIGURE 6, that the power source lead $L_1$, is interconnected to the terminal 30 by lead 35 and to the terminal 33 by a branch lead 36 connected to the lead 35. The terminal 31 is adapted to be interconnected to one side 37 of an indicating means 38, such as an indicating light, by a lead 39 with the other side 40 of the indicating means 38, being interconnected to ground by a lead 41. The terminal 32 is adapted to be interconnected to one side 42 of a convenience plug-in outlet 43 by a lead 44, the other side 45 of the outlet 43 being interconnected to the ground by a branch lead 46 interconnected to lead 41. The terminal 34 is interconnected to one side 47 of a thermostatically operated switch means 48 by a lead 49, the other side 50 of the thermostatically operated switch 48, being interconnected to the end 29 of the heater means 27 by a lead 51.

The thermostatically operated valve means 48 senses the temperature of the oven 26 by means of a conventional temperature sensing element 52 and is manually set by a control knob 53.

The thermostatically operated means 48 is adapted to maintain the temperature of the oven 26 at a cooking temperature selected by the knob 53 in a manner hereinafter set forth.

A sixth terminal 54, of the timer means 22 is interconnected to one side 55 of a second thermostatically operated switch means 56 by a lead 57, the other side 58 of the thermostatically operated switch means 56 being interconnected to the side 29 of the heater means 27 by a lead 59.

The thermostatically operated switch means 56 is adapted to sense the temperature of the oven 26 by a conventional temperature sensing means 60 and is manually set to maintain a warmth-retaining and non-cooking temperature by a manually operated control knob 61.

The terminals 30 and 34 of the timer means 20 respectively carry resilient switch blades 62 and 63 having electrical contact means 64 and 65 on the outer ends thereof, the resiliency of the blades 62 and 63 normally urging the contact means 64 and 65 to the position illustrated in FIGURES 4 and 8 for a purpose hereinafter described.

Figure 9:
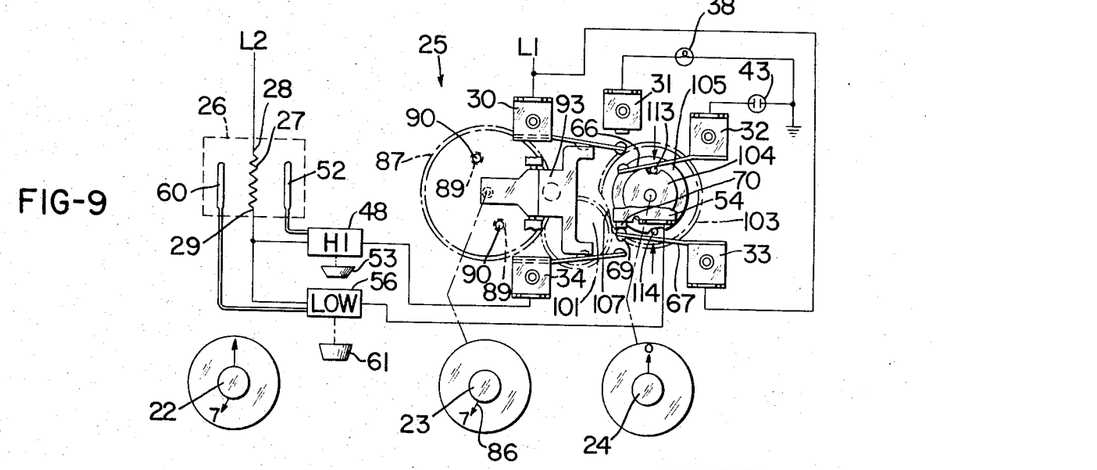
FIGURE 9 is a view similar to FIGURE 8 and illustrates the control system in its warmth-retaining and non-cooking position.

The terminals 32 and 33 of the timer means 20 also respectively carry a pair of resilient switch blades 66 and 67 respectively having electrical contact means 68 and 69 on the outer ends thereof, the natural resiliency of the spring blades 66 and 67 normally tending to maintain the contact means 68 and 69 in the position illustrated in FIGURES 6 and 9.

The terminal means 54 of the timer means 20 is electrically interconnected to a fixed contact means 70 whereby when the switch blade 67 is in the position illustrated in FIGURES 6 and 9, the contact means 69 is placed into electrical contact with the contact means 70 for a purpose hereinafter described.

The terminal 31 of the timer means 20 also carries a fixed contact 71 adapted to be engaged by the contact means 64 of the switch blade 62 when the switch blade 62 is moved outwardly to the position illustrated in FIGURE 6 in a manner hereinafter described.

The timer means 20 includes a cover plate 72 having the conventional twelve-hour clock face 73 thereon with the control knob 22 being interconnected to a shaft means 74 controlling the conventional hour hand 75 and minute hand 76.

In addition, the shaft means 74 carries a timer pointer 77 movable across a timer face 78 on the panel 72.

The hands 75 and 76 are driven relative to the clock face 73 by a conventional electrical motor 79 interconnected to the shaft means 74 by conventional gear train means 80.

In this manner, the operator can adjust the hands 75 and 76 to the proper time by the control knob 22 in a conventional manner and can set the pointer 77 at a desired time interval whereby when the timer hand 77 is driven back to the "off" position thereof by the timer motor 79, the conventional bell 81 will ring indicating that the timer interval has lapsed.

The gear train 80 of the timer motor 79 includes a rotatable gear 82 meshing with another rotatable gear 83, the rotatable gear 83 being rotatably mounted to the frame means 21 by pushing means 84.

The control knob 23 for setting the start time is mounted on a rotatable and axially movable shaft 85 disposed in the bushing 84, the shaft 85 carrying a pointer 86 movable across a clock face 87 on the panel 72 for a purpose hereinafter described.

The shaft 85 carries a member 87 that rotates and moves axially in unison with the shaft 85, the member 87 having gear teeth 88 on the outer periphery thereof for a purpose hereinafter described. The member 87 has a plurality of slots 89 passing therethrough and adapted to register with and receive outwardly directed tangs 90 carried by the gear 83 whereby when the member 87 is clutched to the gear 83 by the tangs 90 being received in the slots 89, the pointer 86 on the shaft means 85 moves in unison with the gear 83 being driven by the gear 82 of the timer motor 79.

The gear ratio is so constructed and arranged that the pointer 86, when driven by the gear 83 in the manner previously described, indicates the same time on the clock face 87' that the hands 75 and 76 are indicating on the clock face 78.

The shaft means 85 has an end 91 engageable with an end 92 of a lever 93 pivotally mounted to the frame means 21 by a pivot pin means 94. A compression spring 95 is disposed between the frame means 21 and the lever 93 in such a manner that the force of the compression spring 95 tends to hold the lever 93 in the pivoted position illustrated in FIGURES 2 and 6 for a purpose hereinafter described, whereby the shaft 85 is in the out position illustrated in FIGURE 2 and the gear member 87 is clutched to the gear member 83 so that the pointer 86 moves in unison with the clock hands 75 and 76 in the manner previously described.

Figure 4:
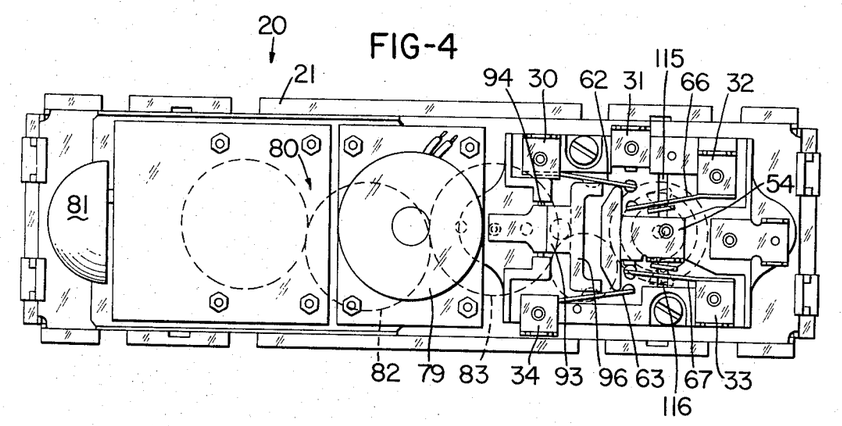
FIGURE 4 is a view similar to FIGURE 3 with other parts of the structure of FIGURE 1 broken away.
Figure 10:
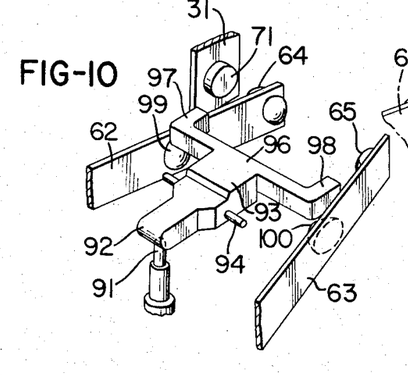
FIGURE 10 is a fragmentary, perspective view illustrating part of the timer means of FIGURE 1.

As illustrated in FIGURES 4 and 10, the lever 93 has a U-shaped end 96 provided with arms 97 and 98 respectively adapted to cam against cam means or embossments 99 and 100 respectively carried by the spring blades 62 and 63.

For example, when the shaft 85 is moved axially inwardly in the manner illustrated in FIGURE 5, the arms 97 and 98 of the lever 93 are pivoted in a clockwise direction to cam against the cam means 99 and 100 of the spring blades 62 and 63 to move the same outwardly to the position illustrated in FIGURE 6 for a purpose hereinafter described.

An idler gear wheel 101 is rotatably mounted to the frame means 21 and is urged in meshing relation with the gear teeth 88 of the gear wheel 87 by a tension spring 101', the idler gear wheel 101 only being in meshing relation with the gear 87 when the gear wheel 87 is clutched to the gear wheel 83. For example, see FIGURE 5 wherein the gear wheel 87 is moved out of meshing relation with the gear wheel 101 when the shaft 85 is moved axially inwardly to declutch the gear wheel or member 87 from the gear member 83 for a purpose hereinafter described.

The knob 24 is carried on a shaft 102 rotatably mounted to the frame means 21, the shaft 102 having a gear member 103 and a pair of cam members 104 and 105 fixed thereto to rotate in unison with the shaft 102.

Figure 12:
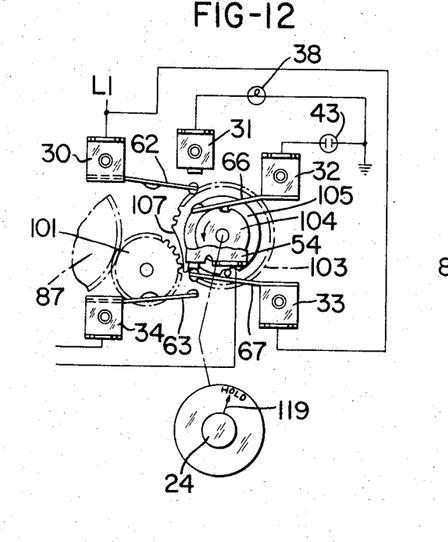
FIGURE 12 is an enlarged, fragmentary, schematic view similar to FIGURE 6 and illustrates the system in its warmth-retaining and non-cooking position.

As illustrated in FIGURE 12, the gear member 103 on the shaft 102 has gear teeth 106 throughout substantially the entire periphery of the member 103 except that a recess 107 is provided therein.

The gear teeth 106 of the gear member 103 are adapted to mesh with the gear teeth of the idler gear or member 101 for a purpose hereinafter described and when the recess 107 of the gear member 103 is disposed adjacent the idler gear 101, rotation of the idler gear 101 will not cause rotation of the gear member 106 and, thus, of the shaft 102 and cam means 104 and 105 for a purpose hereinafter described.

Figure 11:
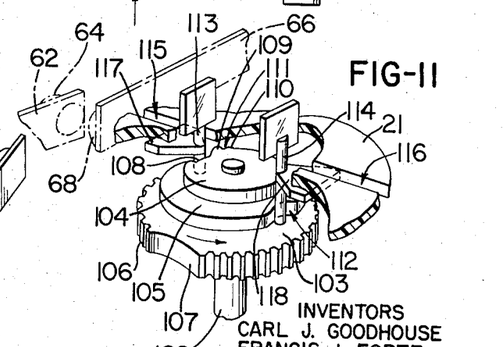
FIGURE 11 is a view similar to FIGURE 10 and illustrates other parts of the timer means of FIGURE 1.

As illustrated in FIGURE 11, the cam 104 on the shaft 102 has a recess 108 formed in the outer periphery thereof and a pair of projections 109 and 110 formed in the outer periphery thereof to define a holding recess 111 for a purpose hereinafter described.

The other cam 105 on the shaft 102 has a recess 112 formed in the outer periphery thereof and disposed diametrically opposite the recess 108 in the cam 104.

A pair of cam followers 113 and 114 respectively follow the outer peripheral contour of the cams 104 and 105 and are movable radially inwardly and outwardly relative to the shaft 102 in guide slots 115 and 116 in the frame means 21, the cam followers 113 and 114 respectively carrying pushers or tabs 117 and 118 respectively engageable with the spring blades 66 and 67.

Figure 13:
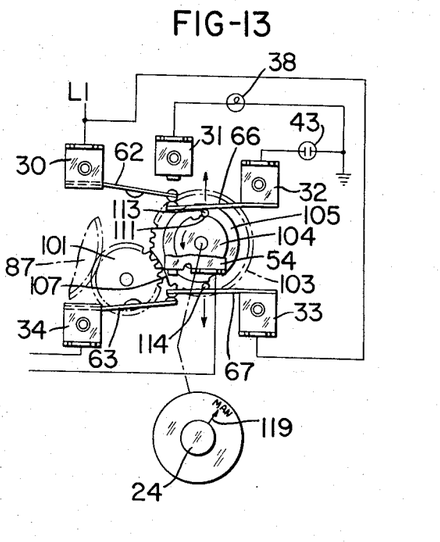
FIGURE 13 is a view similar to FIGURE 12 but illustrates the system set in its "manual" position.

When the control knob 24 on the shaft 102 is rotated to rotate the gear member 103 and cams 104 and 105 to the "manual" position as indicated by a pointer 119 carried by the shaft 102 and movable across an indicating face 120 on the control panel 72, it can be seen in FIGURE 13 that the cam followers 113 and 114 are moved radially outwardly to hold the switchblades 66 and 67 in the position illustrated in FIGURE 13 with the cam follower 113 being received in the holding recess 111 of the cam 104 while the recess 107 of the gear member 103 prevents the idler wheel 101 from rotating the shaft 102 from its "manual" position.

Also, when the control knob 24 on the shaft 102 is rotated to position the pointer 119 in a cooking hours position, such as in FIGURE 7, the cam followers 113 and 114 are moved radially outwardly by the cams 104 and 105 to hold the springblades 66 and 67 in the position illustrated in FIGURE 7 while the gear teeth 106 of the gear member 103 are disposed in meshing relation with the gear teeth of the idler gear 101 so that rotation of the idler gear 101 in a manner hereinafter described will cause rotation of the shaft 102 in a clockwise direction toward the "hold" position thereof.

When the shaft 102 is driven to the "hold" position thereof by the idler gear 101, or is manually set by the control knob 24 in the "hold" position, in the manner illustrated in FIGURE 9, the recess 107 of the gear member 103 prevents rotation of the shaft 102 by the idler gear 101 and the cam followers 113 and 114 are respectively received in the recesses 108 and 112 of the cams 104 and 105 to permit the springblades 66 and 67 to be disposed in the position illustrated in FIGURE 9 for a purpose hereinafter described.

The operation of the compact timer means 20 of this invention will now be described in connection with the system 25 illustrated in FIGURES 6–13.

Assuming that the housewife or the like desires to place food in the oven 26 at 1:30 to be cooked at a high cooking temperature for four hours with the cooking operation not to start until 3 o'clock, the housewife first sets the control knob 53 of the cooking thermostat 48 at the desired cooking temperature, such as 325° F. or the like. If the system 25 permits the housewife or the like to manually set the desired keep warm and non-cooking thermostat 56, the housewife then sets the control knob 61 to the desired non-cooking and warmth-retaining temperature, such as 150° F. or the like. However, it is to be understood that the low temperature thermostat means 56 could be a fixed thermostat wherein the control knob 61 is merely a factory adjustment so that during the warmth-retaining and non-cooking operation of the oven 26, the oven 26 will be maintained at a preselected temperature, such as 150° F. or the like.

Figure 2:
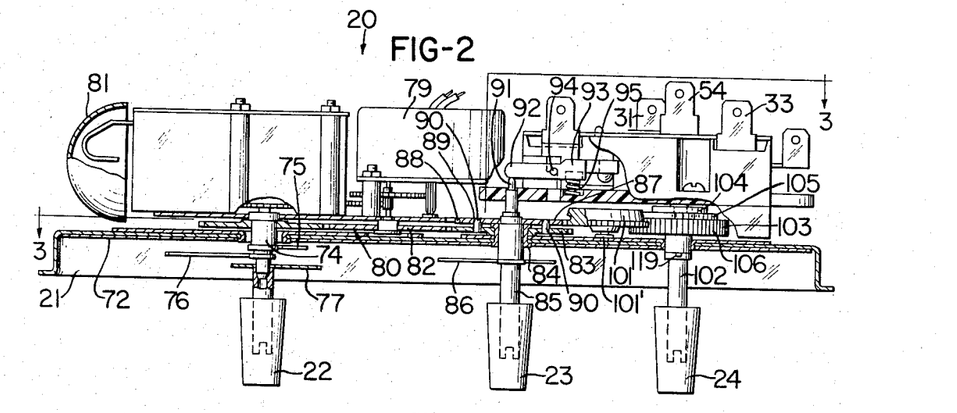
FIGURE 2 is a top view of the structure illustrated in FIGURE 1 with various parts shown in cross-section and other parts thereof broken away.
Figure 5:
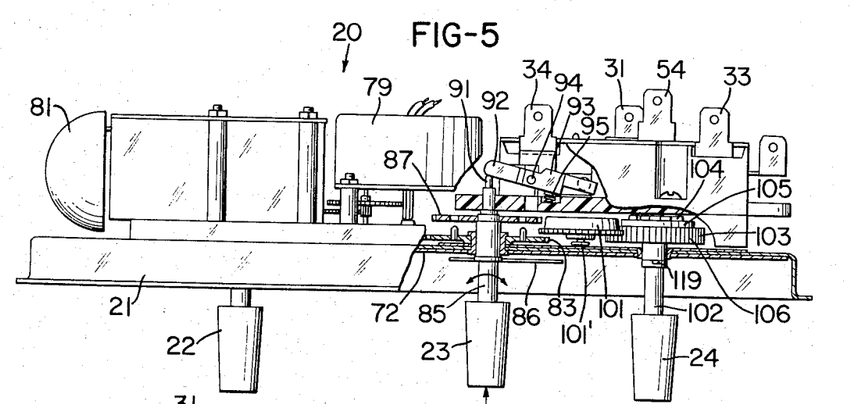
FIGURE 5 is a view similar to FIGURE 2 and illustrates the control means in one of the operating positions thereof.

The housewife then pushes in on the control knob 23 in the manner illustrated in FIGURE 5 to de-clutch the gear member 87 from the gear member 33 and rotates the control knob 23 in a clockwise direction to set the pointer 86 at the selected time of 3 o'clock. It can be seen that when the gear member 87 is rotated in a clockwise direction by the pushed in knob 23, the slot means 89 thereof are now out of register with the tang means 90 so that the force of the compression spring 95 tending to pivot the lever 93 back to the position illustrated in FIGURE 2 is prevented by the unslotted portion of the gear wheel 87 bearing against the end of the tangs 90 whereby the lever 93 is held in the pivoted position of FIGURE 5 until the gear wheel 83 is rotated by the timer clock 79 to again position the tangs 90 in register with the slot means 89 which will occur at the selected 3 o'clock period.

With the gear wheel 87 now set in the 3 o'clock position thereof, it can be seen that the arms 97 and 98 of the lever 93 have moved the switchblades 62 and 63 outwardly to the position illustrated in FIGURE 6 whereby the contact means 64 is placed against the contact 71 so that current will flow through the indicating means 38 to indicate that a future time has been set for the oven 26 to begin a cooking operation after the lapse of a first timed interval set by the control knob 23 in the manner previously described.

Figure 7:
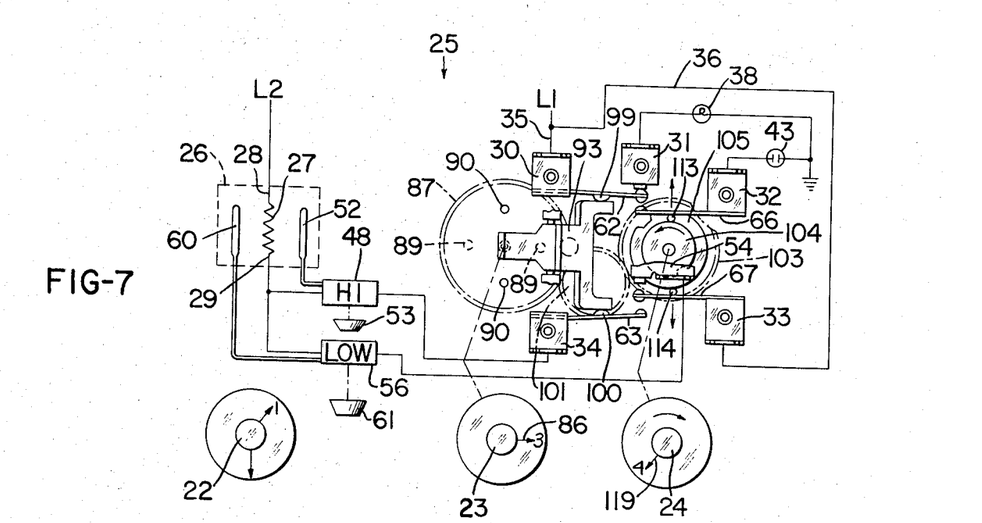
FIGURE 7 is a view similar to FIGURE 6 and illustrates the control system being set in its cooking time position.

Thereafter, the housewife rotates the knob 24 to set the pointer 119 at the desired length of cooking time which in the example illustrated in the drawings is 4 hours as illustrated in FIGURE 7. With the control knob 24 now set for a 4-hour cooking time period, the cam followers 113 and 114 have been moved outwardly by the cams 104 and 105 to hold the switchblades 56 and 67 in the position illustrated in FIGURE 7 wherein the contact means 68 and 69 thereof are held out of contact with any cooperable contact means of the system 25.

In this manner, the control system 25 has now been set so that a cooking operation will not take place in the oven 26 until 3 o'clock and will cook the food in the oven 26 at 3 o'clock for a period of four hours whereby after the four-hour cooking period has lapsed, the control system 25 will automatically reduce the temperature of the oven 26 to the selected non-cooking and warmth-retaining temperature and maintain the temperature in the oven 26 at this selected non-cooking and warmth-retaining temperature indefinitely until the housewife turns off the system 25 in a manner hereinafter described.

While the above setting of the control system 25 to accomplish the above function has been described with the housewife setting the thermostat knobs 53 and 61 in their selected position before setting the control knobs 23 and 24 in their selected positions, it is to be understood that the control knobs 23 and 24 can be set in their selected positions before the setting of the control knobs 53 and 61 as desired.

In any event, with the system 25 now set in the position illustrated in FIGURE 7, it can be seen that as the timer motor 79 is operating, the same is rotating the gear member 83 in such a manner that when it is 3 o'clock, the tangs 90 of the gear wheel 83 have now been brought into registration with the slots 89 of the gear member 87 whereby the force of the compression spring 95 pivots the lever 93 in a counterclockwise direction to move the shaft 85 axially outwardly to carry the gear member 87 into driving relation with the gear member 83 as well as to place the gear teeth 88 of the gear member 87 into driving relation with the gear wheel 101.

Figure 8:
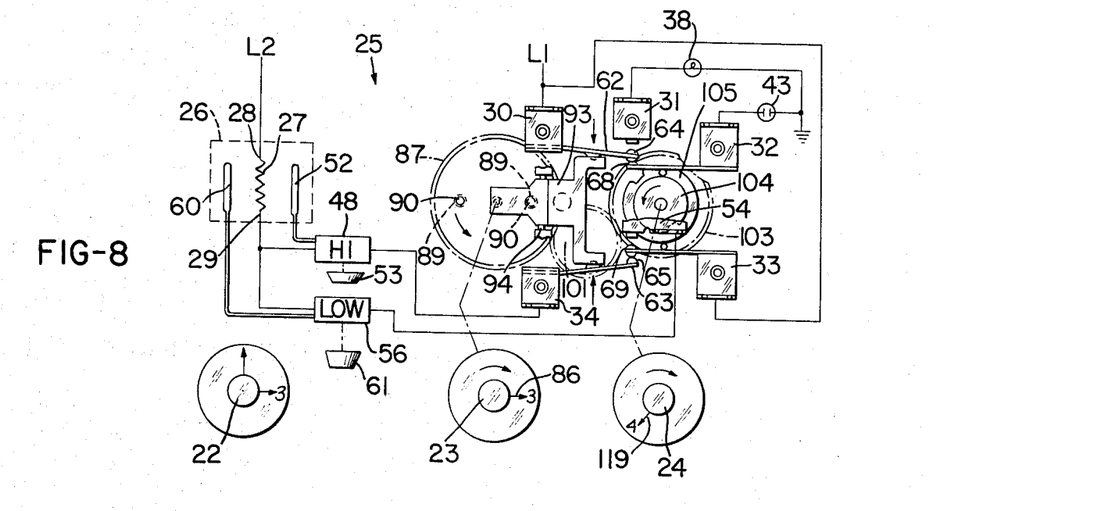
FIGURE 8 is a view similar to FIGURE 6 and illustrates the control system in its cooking position.

When the lever 93 is pivoted back to the position illustrated in FIGURE 2 at 3 o'clock it can readily be seen in FIGURE 8 that the switch blades 62 and 63 move inwardly to respectively place the contacts 64 and 65 thereof into electrical contact with the contacts 68 and 69. With the contacts 65 and 69 being electrically interconnected together, current now flows through the thermostatic switch means 48 wherein the thermostatic switch means 48 interconnects the power source $L_1$ through the heater means 27 to cause operation of the heater means 27 to heat up the oven 26 to the cooking temperature selected by the knob 53, the thermostatic means 48 controlling the operation of the heater means 27 in an on-off manner to maintain the temperature of the oven 26 at the selected cooking temperature in a conventional manner as long as the contacts 65 and 69 are disposed in contact with each other in the manner illustrated in FIGURE 8.

When the gear member 87 has been moved back into driving relation with the gear member 83 at 3 o'clock in the manner previously described, it can be seen that the gear teeth 88 of the gear member 87 are now disposed in meshing relation with the gear teeth on the idler gear 101 so that further rotation of the gear member 83 by the timer motor 79 causes rotation of the idler gear 101. Thus, with the idler gear 101 now being rotated by the timer motor 79, through the gear means 80, 83 and 87, the idler 101 begins to rotate the gear 103 through the meshing relation thereof, so that the cams 104, 103 and shaft 102 are rotated in unison therewith.

Accordingly, at 3 o'clock, not only is the oven 26 now being operated at the cooking temperature selected by the control knob 53, but also the cams 104 and 105 begin to rotate, the cam followers 113 and 114 being held outwardly in the position illustrated in FIGURE 8 until after the lapse of the cooking time set by the control knob 24 which in the example set forth in the drawings is four hours.

At the end of the four hour cooking period, the shaft means 102 has been rotated by the gear means 103 in such a manner that the recesses 108 and 112 of the cams 104 and 105 receive the cam followers 113 and 114 therein in the manner illustrated in FIGURE 9 to permit the switchblades 66 and 67 to move inwardly to the position illustrated in FIGURE 9 while the recess 107 of the gear means 103 is now disposed adjacent the idler gear member 101 so that further rotation of the shaft means 102, gear member 103 and cams 104 and 105 is prevented.

With the switchblades 66 and 67 now moved radially inwardly to the position illustrated in FIGURE 9, it can be seen that the contact 69 is now moved out of electrical contact with the contact 65 to terminate the operation of the heater means 27 under the influence of the thermostatic switch 48. The contact 69 has now moved into contact with the fixed contact 70 in the manner illustrated in FIGURE 9 whereby the power source lead $L_1$ is now interconnected to the warmth-retaining and non-cooking thermostatic switch means 56 which will operate the heater means 27 in a conventional manner to maintain the temperature in the oven 26 at the non-cooking and warmth-retaining temperature set by the control knob 61 indefinitely until the housewife or the like turns off the system 25.

For example, when the housewife or the like desires to terminate the non-cooking and warmth-retaining operation of the oven 26, the housewife turns the control knob 61 of the thermostatic means 56 to its off position to terminate the operation of the heating means 27.

If the control knob 61 on the thermostatic means 56 is merely a factory adjustment which cannot be manually operated by the housewife or the like, the housewife turns the control knob 24 to position the pointer 119 in its "manual" position as illustrated in FIGURE 13 to again move the springblades 66 and 67 outwardly whereby the contact 70 is moved out of electrical contact with the contact 70 to terminate the operation of the warmth-retaining and non-cooking thermostatic means 56 and places the contact 69 back into electrical contact 65 whereby the high temperature thermostatic means 48 would operate in the manner previously described. However, the housewife turns the control knob 53 of the thermostatic means 48 to its off position so that heater means 27 cannot be operated even though the contacts 69 and 65 are in electrical contact with each other.

Figure 14:
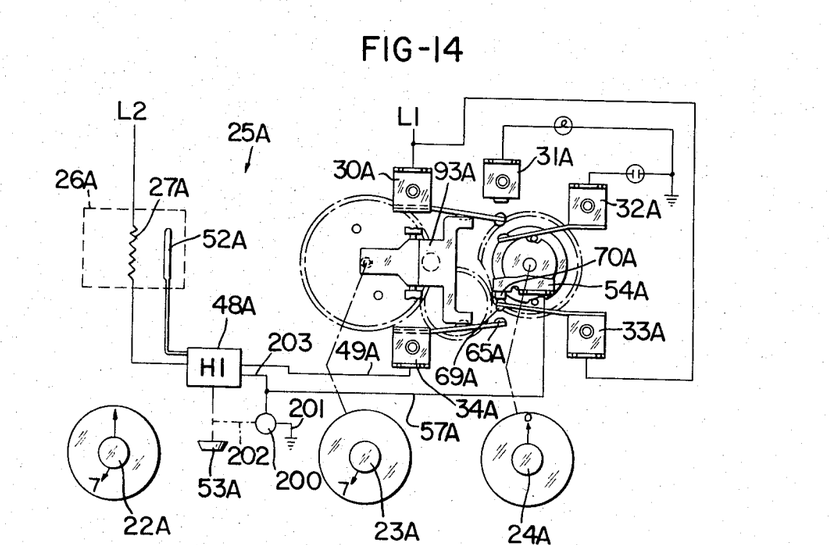
FIGURE 14 is a view similar to FIGURE 6 and illustrates another embodiment of this invention.

Thus, it can be seen that when the system 25 is set in its "manual" position of FIGURE 14, the housewife or the like can operate the oven 26 for a conventional cooking operation by merely turning on and off the control knob 53 of the thermostatic means 48 without any automatic operation other than the thermostatic means 48 maintaining the oven 26 at the temperature selected by the knob 53 for conventional cooking operations.

Also, it can readily be seen in FIGURE 9, that should the housewife or the like merely desire to utilize the oven 26 for a warmth-retaining and non-cooking operation thereof, such as for plate warming or defrosting foods or the like, the housewife can merely turn the control knob 24 to its "hold" position as illustrated in FIGURE 9 whereby the contact 69 will be placed into contact with the contact 70 so that the thermostatic means 56 will operate the heater 27 in a manner to maintain the oven 26 at the low temperature set by the control knob 61.

Also, it can be seen that the housewife or the like can place food in the oven 26 and have the same immediately cooked at a high cooking temperature for a selected number of hours or the like and have the system 25 automatically reduce the temperature of the oven 26 to a warmth-retaining and non-cooking temperature after the lapse of the preselected cooking time.

For example, the housewife does not set the control knob 23 and merely sets the control knob 24 for the desired number of cooking hours or the like whereby immediately the high thermostat means 48 is operated in the condition illustrated in FIGURE 8 and will maintain the temperature of the oven 26 at the selected cooking temperature as set by the control knob 53 until the control knob 24 returns to the "hold" position of FIGURE 9 to maintain the temperature of the oven 26 at the warmth-retaining and non-cooking temperature in the manner previously described.

Further, the control system 25 of this invention can be utilized to control the operation of an appliance plugged into the convenience outlet 43 in a manner now to be described.

For example, the housewife or the like can plug an automatic coffee maker into the outlet plug 43 before going to bed and set the control system 25 of this invention in a manner hereinafter described to cause the automatic coffee maker to be turned on in the morning at a preselected time and to remain on for another preselected time.

For example, with the oven thermostats 53 and 61 turned to their off positions, the housewife sets the control knob 23 for the selected time that the coffeemaker is to be started in the morning, such as 6 o'clock whereby the spring blades 62 and 63 are moved out to the position illustrated in FIGURE 6 to turn on the indicating lamp 38 in the manner previously described. Thereafter, the housewife sets the control knob 24 for the desired length of time that the coffeemaker is to be turned on after the start time in the morning, say one hour, whereby the springblades 66 and 67 are moved outwardly to the position illustrated in FIGURE 7. Thus, when six o'clock in the morning is reached, the springblades 62 and 63 are moved inwardly to the position illustrated in FIGURE 8 in the manner previously described whereby the indicating light 38 is turned off and the contact 64 is placed into electrical contact with the contact 68 so that current from he power source $L_1$ now flows to the side 42 of the plug 43, through the automatic coffee maker back to the other side 45 of the outlet 43 and, thus, to ground through the lead 46 whereby the coffee maker is actuated as long as the contact 68 is in contact with the contact 64. However, when the control knob 24 moves over to the "hold" position after the start time, the springblades 66 and 67 move to the position illustrated in FIGURE 9 to terminate the operation of the coffee maker by moving the contact 68 away from the contact 64.

Thus, it can be seen that the convenience outlet 33 of the system 25 can be utilized substantially in the same manner as the oven means 26 previously described, the outlet 43 being immediately actuated when the knob 24 is moved to its "manual" position as illustrated in FIGURE 13 and being turned off when the control knob 24 is moved to its "hold" position.

While the system 25 previously described has been illustrated as having two thermostatically operated switches 48 and 56 respectively for the cooking temperatures and non-cooking temperatures, it is to be understood that one thermostatic switch can be provided, if desired.

For example, reference is now made to FIGURE 14 wherein another system of this invention is generally indicated by the reference numeral 25A and parts thereof similar to the system 25 previously described are indicated by like reference numerals followed by the reference letter A.

As illustrated in FIGURE 14, a single thermostatic means 48A is provided and has a temperature range manually selectable by a control knob 53A whereby the housewife sets the control knob 53A at the desired cooking temperature and the thermostat means 48A maintains the oven 26A at the desired cooking temperature when the contacts 65A and 69A are in contact with each other in the manner previously described with regard to the system 25 of FIGURE 6.

However, when the cooking cycle has been completed and the contact 69A is moved against the contact 70A in the manner provided in FIGURE 9, it can be seen that the current being directed to the lead 57A passes through a heat motor 200 and from the heat motor to ground through a lead 201. When the heat motor 200 is energized in the above manner, the heat motor 200, through suitable mechanical means 202, rotates the control knob 53A to a warmth-retaining and non-cooking temperature setting thereof whereby the thermostatic means 48A is now supplied current from the lead $L_1$ by a branch lead 203 interconnected to the lead 57A to control the operation of the heater means 27A in the manner previously described.

Therefore, it can be seen that this invention not only provides a control system for accomplishing new and improved cooking procedures as well as prior known cooking procedures, but also this invention provides an improved timer control means for such a system or the like.

While the form of the invention now preferred has been disclosed as required by statute, other forms may be used, all coming within the scope of the claimed subject matter which follows.

What is claimed is:

1. In combination, heating means for cooking food or the like, thermostatically operated means having a first condition for operating said heating means for a first temperature effect thereof and having a second condition for operating said heating means for a second temperature effect thereof, timer means, a first selector means operatively interconnected to said thermostatically operated means and said timer means to actuate said thermostatically operated means in said first condition thereof after a first lapse of time selected by said first selector means, and a second selector means operatively interconnected to said thermostatically operated means and said timer means to actuate said thermostatically operated means in said second condition thereof after a second lapse of time selected by said second selector means.

2. A combination as set forth in claim 1 wherein said second selector means will actuate said thermostatically operated means in said second condition thereof after said second lapse of time following said first lapse of time.

3. A combination as set forth in claim 1 wherein said second selector means has one position that will terminate actuation of said thermostatically operated means in said second condition thereof.

4. A combination as set forth in claim 3 wherein said second selector means is disconnected from said timer means in said one position of said second selector means.

5. A combination as set forth in claim 4 wherein said first selector means interconnects said timer means to said second selector means after the lapse of said first lapse of time selected by said first selector means to cause said second selector means to maintain said thermostatically operated means in said actuated first condition thereof during the entire second lapse of time selected by said second selector means.

6. A combination as set forth in claim 1 wherein said second selector means has a "manual" position wherein said first selector means when in one position thereof causes actuation of said thermostatically operated means in said first condition thereof until said thermostatically operated means is manually turned off.

7. A combination as set forth in claim 6 wherein said first selector means can be set for said lapse of time thereof whereby said timer means will place said first selector means in said one position thereof after the lapse of said first lapse of time.

8. A combination as set forth in claim 7 wherein said first selector means will remain in said one position thereof until manually set in another position thereof.

9. A combination as set forth in claim 1 wherein first means are provided for interconnecting said timer means to said first selector means after the lapse of said first lapse of time selected by said first selector means, and wherein second means are provided for interconnecting said second selector means to said first means when said second selctor means has been set for selecting a second lapse of time whereby said timer means operates said second selector means after the lapse of said first lapse of time set by said first selector means.

10. A combination as set forth in claim 9 wherein said second means disconnects said second selector means from said first means when said second lapse of time selected by said second selector means has lapsed whereby said thermostatically operated means remains in said second condition thereof until said thermostatically operated means is manually turned to its off position.

11. In combination, heating means for cooking food or the like, thermostatically operated means having a first condition for operating said heating means for a first temperature effect thereof and having a second condition for operating said heating means for a second temperature effect thereof, timer means, a first selector means operatively interconnected to said thermostatically operated means and said timer means to actuate said thermostatically operated means in said first condition thereof after a first lapse of time selected by said first selector means operatively interconnected to said thermostatically operated means and said timer means to actuate said thermostatically operated means in said second condition thereof after a second lapse of time selected by said second selector means, said timer means including a first rotatable member having first clutch means thereon, said first selector means including a second rotatable member having second clutch means for engaging said first clutch means to clutch said first and second members together, said first selector means having shaft means for axially moving said second member away from said first clutch means and rotationally out of register with said first clutch means whereby said second member will not be driven by said first member until said first clutch means is again registered with said second clutch means after the lapse of said first lapse of time selected by said first selector means, said second selector means including a third rotatable member adapted to be driven by said second member when said second member is driven by said first member, said third member having shaft means having means disconnecting said third member from driven relationship with said second member after the lapse of said second lapse of time selected by said second selector means.

12. A combination as set forth in claim 11 wherein a first movable electrical contact is provided, said first selector means having means for moving said first contact to one position when said second member is clutched with said first member and for moving said first contact to another position when said second member is declutched from said first member, said first contact being adapted to control actuation of said thermostatically operated means in said first condition thereof, a second electrical contact being adapted to control actuation of said thermostatically operated means in said second condition thereof, and a third movable electrical contact interconnected to a power source, said third contact having one position engaging said first contact only when said first contact is in its one position, said third contact having another position engaging said second contact, said second selector means having means for holding said third contact in said one position thereof when said second selector means is selecting a second lapse of time and for holding said third contact in said other position thereof after the lapse of said second lapse of time.

13. A combination as set forth in claim 12 wherein said second selector means has a "manual" position that positions said third member in its disconnected relationship with said second member and holds said third contact in its said one position thereof.

14. A combination as set forth in claim 12 wherein a fourth movable electrical contact is provided and is interconnected to said power source, said moving means of said first selector means moving said fourth contact to one position thereof when second member is clutched with said first member and moving said fourth contact to another position thereof when said second member is declutched from said first member.

15. A combination as set forth in claim 14 wherein a fifth electrical contact is provided and is electrically connected to an indicating means, said fourth contact engaging said fifth contact when said fourth contact is in said other position thereof.

16. A combination as set forth in claim 14 wherein a sixth movable electrical contact is provided and is electrically interconnected to an electrical plug-in outlet, said second selector means having said moving means thereof moving said sixth contact to one position thereof when said second selector means is set in a position thereof selecting said second lapse of time to be engaged by said fourth contact when said fourth contact is only in said one position thereof and for moving said sixth contact to another position thereof away from said fourth contact after the lapse of said second lapse of time.

17. A timer means for controlling the heating means for a cooking apparatus or the like, said timer means having a first selector means to be operatively interconnected to a thermostatically operated means of said heating means, said timer means having a timer, said first selector means being operatively interconnected to said timer to actuate said thermostatically operated means in a first condition thereof to produce a first temperature effect of said heating means after a first lapse of time selected by said first selector means, and a second selector means operatively interconnected to said timer means and being adapted to be operatively interconnected to said thermostatically operated means to actuate said thermostatically operated means in a second condition thereof to produce a second temperature effect of said heating means after a second lapse of time selected by said second selector means.

18. A timer means as set forth in claim 17 wherein said second selector means is adapted to actuate said thermostatically operated means in said second condition thereof after said second lapse of time following said first lapse of time.

19. A timer means as set forth in claim 17 wherein said second selector means has one position thereof that is adapted to terminate actuation of said thermostatically operated means in said second condition thereof.

20. A timer means as set forth in claim 19 wherein said second selector means is disconnected from said timer in said one position of said second selector means.

21. A timer means as set forth in claim 20 wherein said first selector means interconnects said timer to said second selector means after the lapse of said first lapse of time selected by said first selector means to cause said second selector means to maintain said thermostatically operated means in said actuated first condition thereof during the entire second lapse of time selected by said second selector means.

22. A timer means as set forth in claim 17 wherein said second selector means has a "manual" position wherein said first selector means when in one position thereof is adapted to cause actuation of said thermostatically operated means in said first condition thereof until said thermostatically operated means is manually turned off.

23. A time means as set forth in claim 22 wherein said first selector means can be set for said lapse of time thereof whereby said timer will place said first selector means in said one position thereof after the lapse of said first lapse of time.

24. A timer means as set forth in claim 23 wherein said first selector means will remain in said one position thereof until manually set in another position thereof.

25. A timer means as set forth in claim 17 wherein first means are provided for interconnecting said timer to said first selector means after the lapse of said first lapse of time selected by said first selector means, and wherein second means are provided for interconnecting said second selector means to said first means when said second selector means has been set for selecting a second lapse of time whereby said timer operates said second selector means after a lapse of said first lapse of time set by said first selector means.

26. A timer means as set forth in claim 25 wherein said second means disconnects said second selector means from said first means when said second lapse of time selected by said second selector means has lapsed whereby said thermostatically operated means would remain in said second condition thereof until said thermostatically operated means is manually turned to its off position.

27. A timer means for controlling the heating means for a cooking apparatus or the like, said timer means having a first selector means to be operatively interconnected to a thermostatically operated means of said heating means, said timer means having a timer, said first selector means being operatively interconnected to said timer to actuate said thermostatically operated means in a first condition thereof to produce a first temperature effect of said heating means after a first lapse of time selected by said first selector means, and a second selector means operatively interconnected to said timer means and being adapted to be operatively interconnected to said thermostatically operated means to actuate said thermostatically operated means in a second condition thereof to produce a second temperature effect of said heating means after a second lapse of time selected by said second selector means, said timer including a first rotatable member having first clutch means thereon, said first selector means including a second rotatable member having second clutch means for engaging said first clutch means to clutch said first and second members together, said first selector means having shaft means for axially moving said second member away from said first clutch means and rotationally out of register with said first clutch means whereby said second member will not be driven by said first member until said first clutch means is again registered with said second clutch means after the lapse of said first lapse of time selected by said first selector means, said second selector means including a third rotatable member adapted to be driven by said second member when said second member is driven by said first member, said third member having shaft means for setting the rotational position of said third member relative to said second member, said third member having means disconnecting said third member from driven relationship with said second member after the lapse of said second lapse of time selected by said second selector means.

28. A timer means as set forth in claim 27 wherein a first movable electrical contact is provided, said first selector means having means for moving said first contact to one position when said second member is clutched with said first member and for moving said first contact to another position when said second member is declutched from said first member, said first contact being adapted to control actuation of said thermostatically operated means in said first condition thereof, a second electrical contact being adapted to control actuation of said thermostatically operated means in said second condition thereof, and a third movable electrical contact interconnectible to a power source, said third contact having one position engaging said first contact only when said first contact is in its one position, said third contact having another position engaging said second contact, said second selector means having means for holding said third contact in said one position thereof when said second selector means is selecting a second lapse of time and for holding said third contact in said other position thereof after the lapse of said second lapse of time.

29. A timer means as set forth in claim 28 wherein said second selector means has a "manual" position that positions said third member in its disconnected relationship with said second member and holds said third contact in its said one position thereof.

30. A timer means as set forth in claim 28 wherein a fourth movable electrical contact is provided and is adapted to be interconnected to said power source, said moving means of said first selector means moving said fourth contact to one position thereof when said second member is clutched with said first member and for moving said fourth contact to another position thereof when said second member is declutched from said first member.

31. A timer means as set forth in claim 30 wherein a fifth electrical contact is provided and is adapted to be electrically connected to an indicating means, said fourth contact engaging said fifth contact when said fourth contact is in said other position thereof.

32. A timer means as set forth in claim 30 wherein a sixth movable electrical contact is provided and is adapted to be electrically interconnected to an electrial plug-in outlet, said second selector means having said moving means thereof moving said sixth contact to one position thereof when said second selector means is set in a position thereof selecting said second lapse of time to be engaged by said fourth contact when said fourth contact is only in said one position thereof and for moving said sixth contact into another position thereof away from said fourth contact after the lapse of said second lapse of time.

References Cited
UNITED STATES PATENTS

| | | | |
|---|---|---|---|
| 2,471,862 | 5/1949 | Candor | 236—46 |
| 3,032,636 | 5/1962 | Schauer | 236—46 X |
| 3,093,722 | 6/1963 | Schauer | 219—492 |
| 3,167,248 | 1/1965 | Douglas | 236—46 |
| 3,170,061 | 2/1965 | Colalillo | 236—46 |
| 3,191,861 | 6/1965 | Dahlgren | 236—46 |
| 3,194,227 | 7/1965 | Beach | 236—46 X |
| 3,214,569 | 10/1965 | Carson | 236—46 X |
| 3,269,651 | 8/1966 | Willson | 236—46 |
| 3,285,513 | 11/1966 | Banathy | 236—46 |

WILLIAM J. WYE, *Primary Examiner.*